(12) United States Patent
Huang et al.

(10) Patent No.: US 11,929,217 B1
(45) Date of Patent: Mar. 12, 2024

(54) LIGHT EMITTING KEYBOARD

(71) Applicant: SUNREX TECHNOLOGY CORP., Taichung (TW)

(72) Inventors: Hua Huang, Taichung (TW); Jian-Guo Guo, Taichung (TW)

(73) Assignee: Sunrex Technology Corp., Taichung (TW)

( * ) Notice: Subject to any disclaimer, the term of this patent is extended or adjusted under 35 U.S.C. 154(b) by 0 days.

(21) Appl. No.: 18/462,885

(22) Filed: Sep. 7, 2023

(30) Foreign Application Priority Data

Jun. 26, 2023 (TW) .................................. 112206477

(51) Int. Cl.
*H01H 13/83* (2006.01)
*F21V 8/00* (2006.01)

(52) U.S. Cl.
CPC ............. *H01H 13/83* (2013.01); *G02B 6/006* (2013.01); *G02B 6/0076* (2013.01); *G02B 6/009* (2013.01)

(58) Field of Classification Search
CPC .... G02B 6/0031; G02B 6/0088; G02B 6/005; G02B 6/0055; G02B 6/0018; G02B 6/006; G02B 6/0028; G02B 6/0073; G02B 6/0021; G02B 27/0172; G02B 6/002; G02B 6/0023; G02B 6/0035; G02B 27/0101; G02B 27/0176; G02B 6/0001; G02B 6/0041; G02B 6/0033; G02B 6/0081; G02B 5/0808; G02B 5/1885; G02B 6/00; G02B 6/0015; H01H 2219/062; H01H 2219/06; H01H 2219/044; H01H 2219/064; H01H 2219/036; H01H 2219/014; H01H 13/023; H01H 13/704; H01H 2223/0345; H01H 2219/054; H01H 2221/024; H01H 9/161; H01H 9/182; H01H 2205/004; H01H 2205/026; G06F 1/1662; H01L 33/58; H01L 29/78633; H01L 33/44; H01L 23/3192; H01L 33/42; H01L 27/14625; H01L 27/14629; H01L 27/153; G02F 1/133553; G02F 1/133512;
(Continued)

(56) References Cited

U.S. PATENT DOCUMENTS

2012/0080297 A1\* 4/2012 Takeuchi ............... H01H 13/83
200/310

FOREIGN PATENT DOCUMENTS

CN 202258947 U \* 5/2012
CN 110335775 A \* 10/2019 ........... G02B 6/0031

\* cited by examiner

*Primary Examiner* — Fatima N Farokhrooz
(74) *Attorney, Agent, or Firm* — Burris Law, PLLC

(57) ABSTRACT

A light emitting keyboard includes a frame having a translucent frame body, a plurality of key modules each having a keycap, and a backlight module including a light source circuit board, a first light guide plate disposed on top of the light source circuit board, a second light guide plate disposed under the light source circuit board, a plurality of first light-emitting members extending upwardly through the first light guide plate, a plurality of second light-emitting members extending downwardly through the second light guide plate, and a reflector plate disposed under the second light guide plate. Light emitted from the first light-emitting members is transmitted in the first light guide plate and projects upwardly onto the keycaps. Light emitted from the second light-emitting members is transmitted in the second light guide plate is reflected by the reflector plate, and projects onto the frame body.

5 Claims, 4 Drawing Sheets

(58) Field of Classification Search
CPC ......... G02F 1/133615; G02F 1/134336; G02F 1/136209; G02F 1/1336; G02F 1/133603; G02F 2203/02; G02F 1/133602; G02F 1/133608; G02F 2202/28
See application file for complete search history.

LIGHT EMITTING KEYBOARD

CROSS-REFERENCE TO RELATED APPLICATION

This application claims priority to Taiwanese Utility Model Patent Application No. 112206477, filed on Jun. 26, 2023.

FIELD

This disclosure relates to a keyboard, and more particularly to a light emitting keyboard.

BACKGROUND

A light emitting keyboard is mainly used to provide convenience and visual effects for use in dark or low light environment. An existing light emitting keyboard mainly focuses on concentrating a light source on a key to provide the key with a light emitting effect. However, the frame of the existing light emitting keyboard is usually only used as an element for supporting and protecting the keyboard structure, and the illumination of the frame is ignored, so that the lighting potential of the frame cannot be fully utilized. Another light emitting keyboard emerges in the market, and a plurality of light-emitting elements are disposed around the frame thereof. However, the location and presentation effects of the light-emitting elements are not ideal, they can only provide illumination in certain specific regions of the frame, there is no illumination or illumination effects are uneven in other regions of the frame, thereby reducing the visual effect and use experience.

SUMMARY

Therefore, an object of the present disclosure is to provide a light emitting keyboard that can alleviate at least one of the drawbacks of the prior art.

Accordingly, the light emitting keyboard of this disclosure includes a frame, a thin film circuit board, a support plate, a plurality of key modules, and a backlight module. The frame includes a frame body that is translucent, and a plurality of key holes formed in the frame body. The thin film circuit board is disposed under the frame, and is light transmissible. The support plate is disposed under the thin film circuit board, and includes a plate body, a plurality of perforation groups formed in the plate body and corresponding to the key holes, and a plurality of through holes formed in the plate body and spaced apart from the perforation groups. The key modules are respectively disposed in the key holes, and correspond to the perforation groups. Each key module includes a keycap, a connecting member pivotally connected between the keycap and the support plate, and a resilient member abutting between the key cap and the thin film circuit board.

The backlight module is disposed under the support plate, and includes a light source circuit board, a first light guide plate disposed on top of the light source circuit board and located below the plate body, a second light guide plate disposed under the light source circuit board, a plurality of first light-emitting members disposed on the light source circuit board and extending upwardly through the first light guide plate, a plurality of second light-emitting members disposed on the light source circuit board opposite to the first light-emitting members and extending downwardly through the second light guide plate, and a reflector plate disposed under the second light guide plate.

Light emitted from the first light-emitting members is transmitted in the first light guide plate, and then passes upwardly through the perforation groups, the thin film circuit board, and the key holes to project onto the keycaps. Light emitted from the second light-emitting members is transmitted in the second light guide plate, is reflected by the reflector plate, and then passes upwardly through the first light guide plate, the through holes and the thin film circuit board to project onto the frame body.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
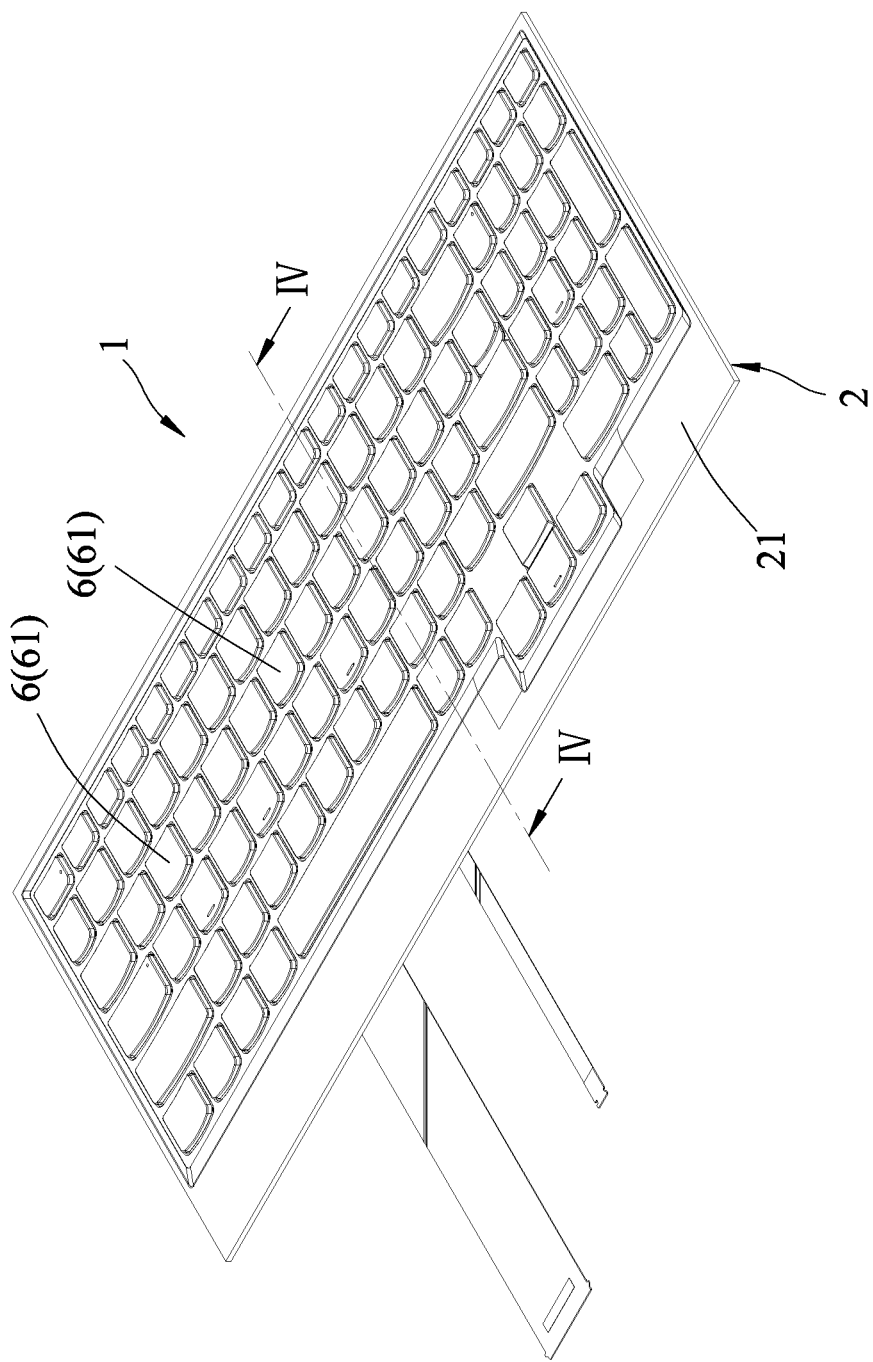
FIG. 1 is an assembled perspective view of a light emitting keyboard according to an embodiment of the present disclosure.

Referring to FIGS. 1 to 4, a light emitting keyboard 1 according to an embodiment of the present disclosure is shown to comprise a frame 2, a thin film circuit board 3, a support plate 4, a covering layer 5, a plurality of key modules 6, and a backlight module 7.

The frame 2 includes a frame body 21 that is translucent, and a plurality of key holes 22 formed in the frame body 21.

The thin film circuit board 3 is light-transmissible, and is disposed under the frame 2.

Figure 2:
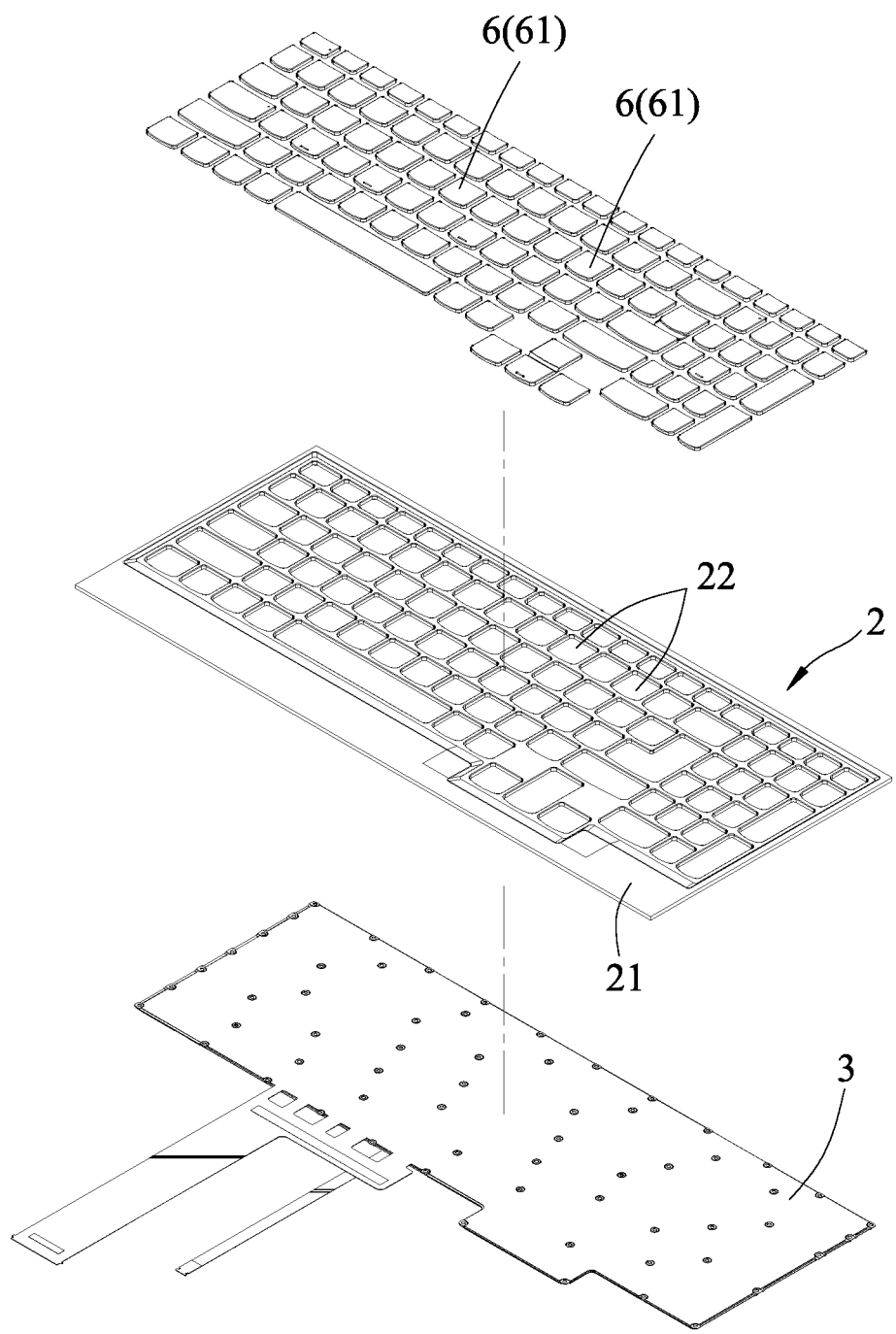
FIG. 2 is an exploded perspective view of a frame, a thin film circuit board and a plurality of key modules of the embodiment.
Figure 4:
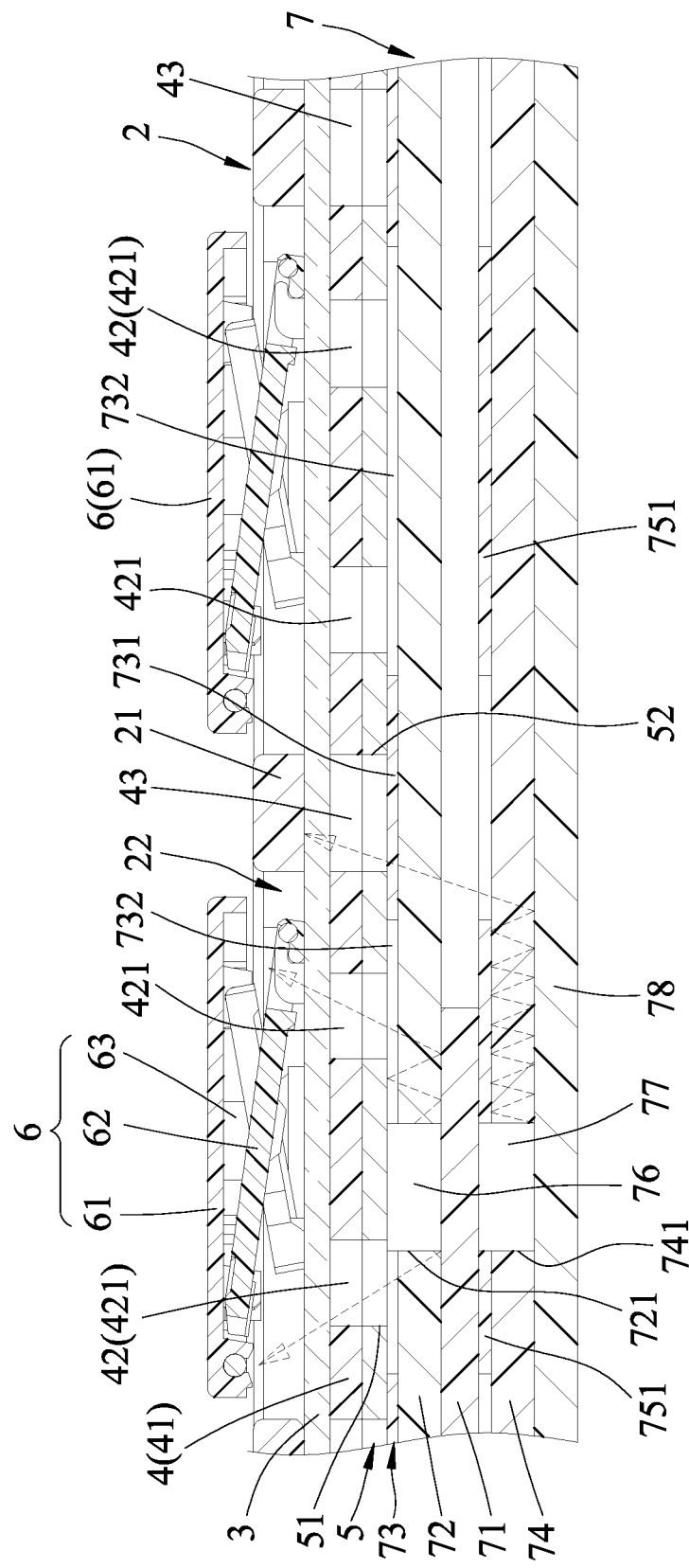
FIG. 4 is a fragmentary sectional view taken along line IV-IV of FIG.

With reference to FIGS. 2 and 4, the support plate 4 is made of metal, and is disposed under the thin film circuit board 3 (中說, claim 1). The support plate 4 includes a plate body 41, a plurality of perforation groups 42 formed in the plate body 41 and corresponding to the key holes 22, and a plurality of through holes 43 formed in the plate body 41 and spaced apart from the perforation groups 42. Each perforation group 42 has four perforations 421 located below a corresponding one of the key holes 22 (because of the sectional view, only two perforations 421 are visible in FIG. 4, but it can be understood that the other two perforations 421 of each perforation group 42 overlap with the two perforations 421 seen in FIG. 4 in the direction of line of sight).

The covering layer 5 is coated on a surface of the plate body 41 opposite to the thin film circuit board 3 using white ink for reflecting light, and has a plurality of first apertures 51 respectively corresponding to the perforations 421, and a plurality of second apertures 52 respectively corresponding to the through holes 43.

Each key module 6 is disposed in a respective one of the key holes 22, and corresponds to a perforation group 42. Each key module 6 includes a keycap 61, a connecting member 62 pivotally connected between the keycap 61 and the support plate 4, and a resilient member 63 abutting between the keycap 61 and the thin film circuit board 3. In this embodiment, the connecting member 62 is a scissor mechanism, and the resilient member 63 is a rubber dome. The four perforations 421 of each perforation group 42 surround a periphery of the resilient member 63.

Figure 3:
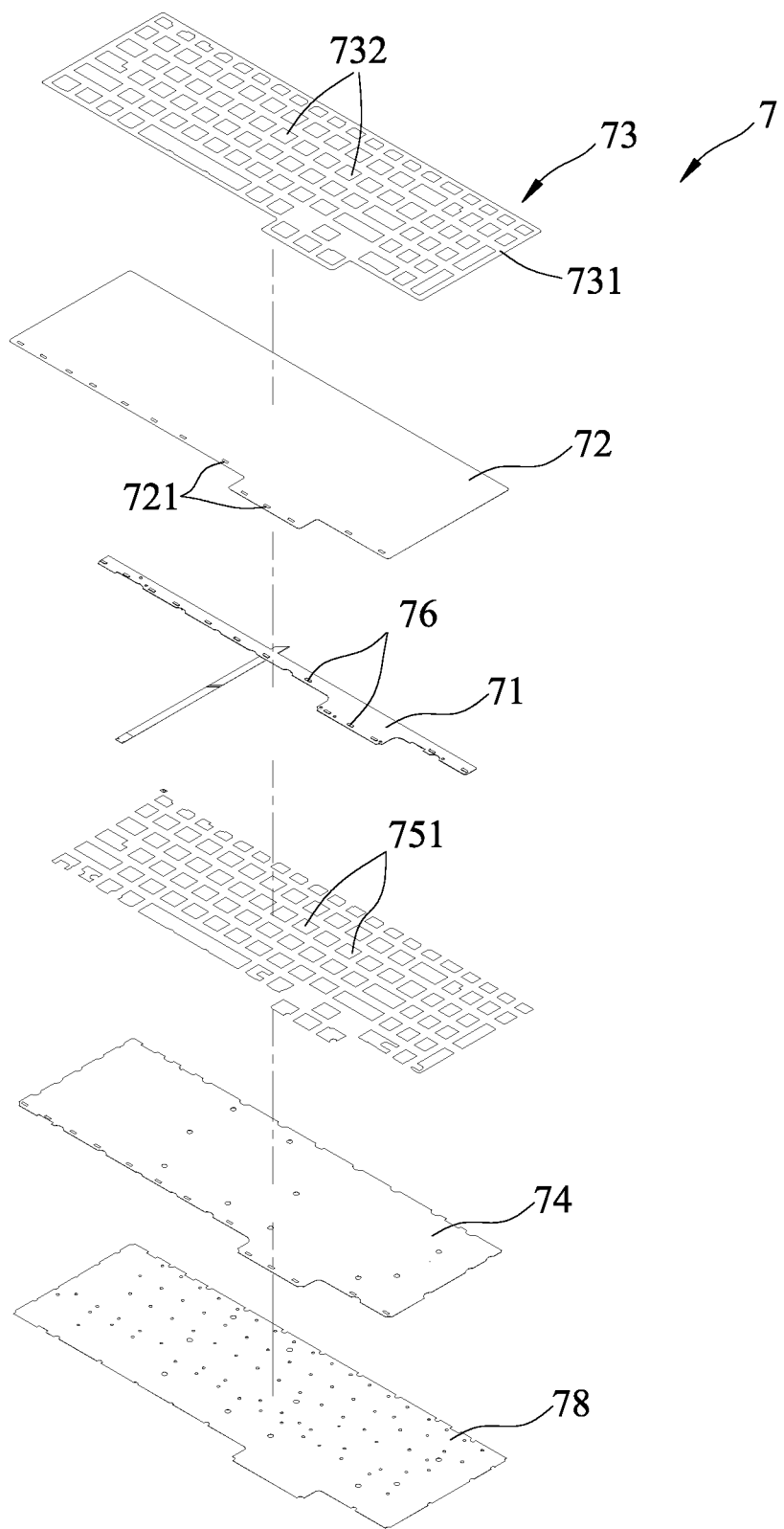
FIG. 3 is an exploded perspective view of a backlight module of the embodiment.

With reference to FIGS. 3 and 4, the backlight module 7 is disposed under the support plate 4 and the covering layer 5, and includes a light source circuit board 71, a first light guide plate 72 disposed on top of the light source circuit board 71 and located under the plate body 41 and the covering layer 5, a semi-light shielding layer 73 coated on a surface of the first light guide plate 72 opposite to the light source circuit board 71, a second light guide plate 74 disposed under the light source circuit board 71, a plurality of first light-emitting members 76 disposed on the light source circuit board 71, a plurality of second light-emitting members 77 (only one is shown in FIG. 4) disposed on the light source circuit board 71 opposite to the first light-emitting members 76, and a reflector plate 78 disposed under the second light guide plate 74.

In this embodiment, the light source circuit board 71 is a flexible printed circuit board.

The first light guide plate 72 has a plurality of spaced-apart through holes 721.

The semi-light shielding layer 73 has a semi-light shielding region 731 disposed below and corresponding in position to the through holes 43 and the second apertures 52, and a plurality of light transmitting regions 732 corresponding in position to the perforation groups 42 and the first apertures 51. The semi-light shielding region 731 is made of a semi-opaque and semi-transparent material to shield part of the light but still allow the other part of the light to penetrate. In this embodiment, the light transmitting regions 732 are through holes communicating with the perforations 421 and the first apertures 51.

The second light guide plate 74 has a plurality of spaced-apart through holes 741.

The backlight module 7 further includes a plurality of spaced-apart reflective regions 751 coated on an upper surface of the second light guide plate 74 using a reflective material and corresponding in position to the light transmitting regions 732.

The first light-emitting members 76 are disposed on an upper surface of the light source circuit board 71. Each first light-emitting member 76 extends upwardly through one of the through holes 721 in the first light guide plate 72 into a corresponding one of the light transmitting regions 732. The second light-emitting members 77 are disposed on a lower surface of the light source circuit board 71. Each second light-emitting member 77 extends downwardly through a spaced between two adjacent ones of the reflective regions 751 into a corresponding one of the through holes 741 in the second light guide plate 74. In this embodiment, the first and second light-emitting members 76, 77 are light-emitting diodes (LEDs). The light source circuit board 71 can use signals to control the first and second light-emitting members 76, 77 to emit light simultaneously or separately and to emit light rays of the same or different colors.

When the light source circuit board 71 controls the first light-emitting members 76 to emit light, the light is transmitted in the first light guide plate 72, and passes upwardly through the light transmitting regions 732, the perforation groups 42, the thin film circuit board 3, and the key holes 22 to project onto the keycaps 61. After part of the light passes through the light transmitting regions 732, it will be reflected by the covering layer 5 to enter the first light guide plate 72 again until the light passes through the light transmitting regions 732, through the perforation groups 42, and upwardly through the thin film circuit board 3 and the key holes 22 to project onto the keycaps 61, so that the keycaps 61 can emit light.

It is worth noting that, although the first light-emitting members 76 are mainly used for illuminating the keycaps 61, part of the light can still pass upwardly through an area of the first light guide plate 72 covered by the semi-light shielding region 731, and then through the through holes 43 and the thin film circuit board 3 to project onto the frame body 21, so that the frame body 21 can emit light.

When the light source circuit board 71 controls the second light-emitting members 77 to emit light, light is transmitted in the second light guide plate 74, and is reflected between the reflective regions 751 and the reflector plate 78 until the light passes upwardly through the first light guide plate 72, the semi-light shielding region 731, the through holes 43, and the thin film circuit board 3 from an area of the second light guide plate 74 not covered by the reflective regions 751 to project onto the frame body 21, so that the frame body 21 can emit light. The light emitted from the second light-emitting members 77 is reflected multiple times between the reflective regions 751 and the reflector plate 78 to enhance the uniformity and strength of light distribution in the second light guide plate 74, so that more light can pass through the semi-light shielding region 731 to project upwardly onto the frame body 21, so that the frame body 21 can emit light.

A user can control the first and second light-emitting members 76, 77 to emit light simultaneously or separately through the light source circuit board 71 according to his/her requirement.

When the user uses the light source circuit board 71 to control only the first light-emitting members 76 to emit light, the keycaps 61 and the frame body 21 emit light, but the light emitting effects of the keycaps 61 are more significant than the light emitting effect of the frame body 21.

When the user uses the light source circuit board 71 to control only the second light-emitting members 77 to emit light, only the frame body 21 emits light.

When the user uses the light source circuit board 71 to control the first and second light-emitting members 76, 77 to emit light simultaneously, the light emitted from the first light-emitting members 76 can allow the keycaps 61 and the frame body 21 to emit light simultaneously, and the light emitted from the second light-emitting members 77 can allow the frame body 21 to emit light. Thus, the frame body 21 can have a significant and uniform light emitting effect.

Furthermore, the user can use the light source circuit board 71 to control the first and second light-emitting members 76, 77 to emit light rays of the same or different colors according to his/her requirement. For example, when the first light-emitting members 76 are controlled to emit white light, the keycaps 61 can then emit white light; and, when the second light-emitting members 77 are controlled to emit orange light, the frame body 21 can then emit orange light. Hence, the light emitting keyboard 1 of this disclosure can provide users with various visual effects and use experiences.

In summary, because the frame body 21 of the light emitting keyboard 1 of this disclosure is translucent, the light emitted from the first light-emitting members 76 can allow the keycaps 61 and the frame body 21 to emit light, and the light emitted from the second light-emitting members 77 can allow the frame body 21 to emit light. Thus, the frame body 21 can have a significant and uniform light emitting effect. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A light emitting keyboard, comprising:
    a frame including a frame body that is translucent, and a plurality of key holes formed in said frame body;
    a thin film circuit board that is disposed under said frame and that is light transmissible;
    a support plate disposed under said thin film circuit board, and including a plate body, a plurality of perforation groups formed in said plate body and corresponding to said key holes, and a plurality of through holes formed in said plate body and spaced apart from said perforation groups;
    a plurality of key modules respectively disposed in said key holes and corresponding to said perforation group, each of said key modules including a keycap, a connecting member pivotally connected between said keycap and said support plate, and a resilient member abutting between said key cap and said thin film circuit board; and
    a backlight module disposed under said support plate and including a light source circuit board, a first light guide plate disposed on top of said light source circuit board and located below said plate body, a second light guide plate disposed under said light source circuit board, a plurality of first light-emitting members disposed on said light source circuit board and extending upwardly through said first light guide plate, a plurality of second light-emitting members disposed on said light source circuit board opposite to said first light-emitting members and extending downwardly through said second light guide plate, and a reflector plate disposed under said second light guide plate, wherein light emitted from said first light-emitting members is transmitted in said first light guide plate, and then passes upwardly through said perforation groups, said thin film circuit board, and said key holes to project onto said key caps, and light emitted from said second light-emitting members is transmitted in said second light guide plate, is reflected by said reflector plate, and then passes upwardly through said first light guide plate, said through holes and said thin film circuit board to project onto said frame body.

2. The light emitting keyboard as claimed in claim 1, wherein said backlight module further includes a semi-light shielding layer coated on a surface of said first light guide plate opposite to said light source circuit board, said light shielding layer having a semi-light shielding region disposed below and corresponding in position to said through holes and covering said first light guide plate, and a plurality of light transmitting regions corresponding in position to said perforation groups, said backlight module further including a plurality of reflective regions coated on a surface of said second light guide plate and corresponding in position to said light transmitting regions, and wherein the light emitted from said first light-emitting members and transmitted in said first light guide plate passes through said light transmitting regions and said perforation group to project upwardly onto said key caps, and the light emitted from said second light-emitting members and transmitted in said second light guide plate is repeatedly reflected between said reflector plate and said reflective regions, and then passes upwardly through said first light guide plate, said semi-light shielding region, said through holes and said thin film circuit board from an area of said second light guide plate not covered by said reflective regions to project onto said frame body.

3. The light emitting keyboard as claimed in claim 1, further comprising a covering layer coated on a surface of said plate body opposite to said thin film circuit board.

4. The light emitting keyboard as claimed in claim 2, wherein said semi-light shielding region of said semi-light shielding layer is made of a semi-opaque and semi-transparent material to allow part of the light to pass therethrough.

5. The light emitting keyboard as claimed in claim 2, wherein said light transmitting regions are through holes respectively communicating with said perforation groups.

* * * * *